United States Patent
Carpenter et al.

(10) Patent No.: US 6,175,989 B1
(45) Date of Patent: Jan. 23, 2001

(54) SHAPE MEMORY ALLOY CONTROLLABLE HINGE APPARATUS

(76) Inventors: Bernie F. Carpenter, 9713 W. Long Dr., Littleton, CO (US) 80123; Jerry L. Draper, 9810 S. Castle Ridge Cir., Highlands Ranch, CO (US) 80126; Russell N. Gehling, 9309 Black Mountain Dr., Conlfer, CO (US) 80433

( * ) Notice: Under 35 U.S.C. 154(b), the term of this patent shall be extended for 0 days.

(21) Appl. No.: 09/084,547

(22) Filed: May 26, 1998

(51) Int. Cl.[7] .................. E05D 1/00; E05D 5/00; H01Q 15/20; B64G 1/44

(52) U.S. Cl. .................. 16/225; 16/226; 16/385; 403/28; 403/32; 136/292; 136/245; 343/915; 52/173.3; 52/71; 60/529; 244/173

(58) Field of Search .................. 16/225, 226, 385; 403/321, 322.1, 322.3, 28, 32, 65, 81; 136/206, 292, 291, 245; 343/DIG. 2, 915, 882, 881; 52/173.3, 646, 655.1, 1, 71; 60/527, 528, 529; 244/219, 75 R, 173

(56) References Cited

U.S. PATENT DOCUMENTS

| | | | |
|---|---|---|---|
| 4,305,206 | 12/1981 | Roe | 33/770 |
| 4,905,972 | * 3/1990 | Scowen | 267/152 |
| 5,035,530 | * 7/1991 | Fukuda et al. | 403/404 |
| 5,196,857 | * 3/1993 | Chiappetta et al. | 244/173 X |
| 5,272,486 | 12/1993 | Dickinson | 343/719 |
| 5,674,027 | 10/1997 | Warnaar | 403/404 |
| 5,785,280 | * 7/1998 | Baghdasarian | 244/173 |

FOREIGN PATENT DOCUMENTS

WO 90/03310 * 4/1990 (WO) .................. 244/173

* cited by examiner

Primary Examiner—Anthony Knight
Assistant Examiner—Robert L. Pilaud
(74) Attorney, Agent, or Firm—Marsh Fischmann & Breyfogle, LLP; Jeffrey A. Divney

(57) ABSTRACT

A shape memory alloy hinge assembly for deploying at least a first object in a controllable, substantially shockless manner is disclosed. Generally, the hinge assembly includes at least a first flexure member capable of moving from a first, folded configuration to a second, straightened configuration, and a controller for controlling the movement of at least the first flexure member as the first flexure member moves or reconfigures from the folded configuration to the straightened configuration.

22 Claims, 9 Drawing Sheets

SHAPE MEMORY ALLOY CONTROLLABLE HINGE APPARATUS

GOVERNMENT RIGHTS

This invention was made with Government support under Contract No. F29601-94-C-0055 awarded by the U.S. Air Force to Lockheed Martin Corp. and the Government has certain rights in this invention.

FIELD OF THE INVENTION

The present invention generally relates to a device for deploying an object interconnected thereto, and in particular, to a hinge assembly for deploying an object interconnected thereto.

BACKGROUND OF THE INVENTION

Various techniques have been used to deploy instrumentation payloads or other appendages from spacecraft. Typically, deployment is initiated from a storage bay after the spacecraft has reached a selected orbit or other extraterrestrial location. The instrumentation may include solar panels, measurement equipment, imaging devices and communication antennae. As can be appreciated, such instrumentation may be very sensitive in nature and should be deployed with minimal vibration or shock.

The design of deployment devices that are capable of accurately, reliably and repeatably delivering sensitive equipment from a stowed position to a deployed position presents a number of challenges. For example, the deployment device should comprise an actuator that can apply the necessary energy to physically move the instrumentation. Further, positioning of the instrumentation should be done in a manner that reduces any risk of damage (e.g., due to rapid or uneven acceleration or deceleration).

Additionally, because the deployment device may be used on an orbiting spacecraft, the deployment device should be lightweight, have a minimal number of parts to reduce maintenance requirements, improve reliability, enhance the mass efficiency of the deployed system, have a compact arrangement in the stowed position to reduce the size of the storage or deployment bay, be resettable and repeatable at least during ground testing of the deployment device to ensure that the device will work as expected while in orbit, and have a low fabrication cost to reduce the overall cost of the spacecraft.

SUMMARY OF THE INVENTION

Accordingly, it is an object of the present invention to provide an assembly for deploying an object from a stowed position to a deployed position.

It is another object of the present invention to provide a deployment assembly for use in a spacecraft, the assembly for deploying an object from a spacecraft in orbit or other extraterrestrial location.

It is a further object of the present invention to provide a deployment assembly which is lightweight, has a minimal number of parts, is compact, is resettable and which provides for a controlled, substantially shockless deployment of an object.

The present invention achieves one or more of these objectives by providing a hinge assembly which is capable of deploying an object in a controllable manner. Generally, for purposes of deploying or moving an object from a first position to a second position, the hinge assembly of the present invention includes at least a first member having first and second end portions and an intermediate portion therebetween, and a means, interconnectable to the first member, for controlling movement or reconfiguration of the first member from at least a first to a second configuration corresponding to first and second positions of the object, respectively. Specifically, in one embodiment, the first member is a first flexure member which is resiliently flexurable about the intermediate portion thereof, and is disposed to flex or spring from a first configuration corresponding to the object in the first position (e.g., a stowed position) to a second configuration corresponding to the object in the second position (e.g., a deployed position). The first flexure member in the first configuration (e.g., bent or folded) has a first stored energy (e.g., pretension) which is greater than a second stored energy of the first flexure member in the second configuration (e.g., straightened). In this regard, the means for controlling flexural movement of the first flexure member functions to control the release of stored energy of the first flexure member when the first flexure member flexes from the first configuration to the second configuration to pivotally move the object to be deployed from a first (e.g., stowed) position to a second (e.g., deployed) position. Of importance, in order to control such flexure to provide for a substantially shockless deployment of the object interconnected to the first flexure member, the means for controlling such springing or flexural movement of the first flexure member from a folded to a straight configuration functions to passively dampen such flexure of at least the first flexure member. In another embodiment, the means for controlling the first member comprises a means for actuating at least the first member from a first configuration corresponding to the object being in a first position, to a second configuration corresponding to the object being in a second position. In this regard, the hinge assembly of the present invention is especially useful for passively or actively deploying objects, such as sensitive instrumentation, solar arrays, antennae or other appendages, from a spacecraft.

As noted hereinabove, for purposes of providing for a substantially shockless movement of an object from a first (e.g., stowed) position to at least a second (e.g., deployed) position, the means for controlling movement of at least the first flexure member as the first flexure member reconfigures or moves from a first, folded configuration to a second, straighter configuration may comprise one of a means for absorbing the stored energy released from the flexure member as the flexure member reconfigures from a folded to a straightened configuration and a means for actuating at least the first flexure member between first and second configurations (e.g., stowed and deployed configurations), or vice versa. In one embodiment, for purposes of passively providing for a substantially shockless deployment of an object as the first flexure member flexes from the first, folded (e.g., U-, L-, or C-shaped) configuration to a second, straighter configuration, the means for absorbing the stored energy or tension from the first flexure member during flexing comprises a damping means. In this regard, the means for absorbing stored energy functions as a dashpot to cushion or dampen the first flexure member as the first flexure member flexes from a folded to a substantially straight configuration, the first flexural member having a higher stored energy in the folded configuration than in the unfolded, straighter configuration. In one embodiment, the damping means for absorbing such stored energy in the first flexure member comprises a first deformable damping member. In another, preferred embodiment, the damping means for absorbing such stored energy in the first flexure member comprises a first plastically deformable damping member of a shape memory alloy having at least a martensite phase. In this regard, as the first flexure member flexes from a folded configuration to a substantially straight configuration, the plastically deformable damping member absorbs the stored energy by plastically deforming without permanently failing the damping member. More specifically, the plastically deformable damping member comprising a shape memory alloy provides passive, substantially shockless deployment by the controlled alignment of the martensite structure by using stored energy of the first flexure member. In this regard, a substantially shockless deployment is achieved by utilizing the elastic component of the shape memory alloy damping member. As such, a hinge apparatus utilizing a plastically deformable damping member comprising a shape memory alloy having at least a martensite phase can be reset and retested for a plurality of cycles without failure of the damping member. Such plastic deformability is especially useful for ground testing of the hinge apparatus to ensure the hinge apparatus functions as designed on orbit. Further, for purposes of effectively moving the hinge to deploy the object, the transition temperature of the shape memory damping member should, at the time of deployment, be higher than the environment temperature (e.g., on orbit).

In this embodiment of the present invention, the means for controlling movement of at least the first flexure member may further include a means for at least initially releasing the pretension forces or stored energy from at least the first flexure member in the first configuration (e.g., folded or bent into a U-shape, L-shaped or C-shape). In particular, the means for releasing is capable of releasably locking at least the first flexure member in a folded configuration.

For purposes of actively controlling, at least initially, at least the first flexure member, the means for controlling movement of at least the first flexure member may comprise a means for actuating at least the first flexure member. In one embodiment, the means for controlling movement of at least the first flexure member comprises a first actuator member having a shape memory alloy and a means for heating the first actuator member to heat, at least initially, the first actuator member in a first, folded configuration, which corresponds to the object in a stowed configuration. In this embodiment, prior to releasing the first flexure member to deploy the object, the means for heating may be used to initially heat the first actuator member to a temperature above the martensitic/austenitic transformation temperature to at least initially hold the first flexure member in the folded configuration. In this regard, the first actuator member may have an austenitic state corresponding to a folded configuration. After release of the first flexure member, the means for heating may discontinue heating of the first actuator, whereby the first actuator member comprising shape memory alloy is allowed to cool to a temperature below the martensitic/austenitic phase transformation temperature of the shape memory alloy. The martensitic phase of the shape memory alloy of the first actuator member may then function to dampen the flex of the first flexure member as the first flexure member moves toward a straightened configuration to deploy the object. In one embodiment, the heating means is electrically connected to at least the first actuator member and comprises an electric source for resistively heating the first actuator member. And, in the event the object is to be deployed to an intermediate, third position between the stowed and deployed position, the first actuator member comprising a shape memory alloy may be heated by the heating means to a selected temperature to selectively maintain a selected configuration of the first actuator member, the selected configuration of the first actuator member corresponding to the intermediate position of the object to be deployed. In this regard, the heating means may comprise a means for regulating the amount of current supplied to the first actuator member. As such, the heating means may be used to vary the rate of actuation and thereby the rate of deployment of the object by varying the temperature of or amount of current supplied to the first actuator member. Where desirable, the heating means may also be used to return the first actuator member to its austenitic shape (e.g., folded) to restow the object by heating the first actuator member to a temperature above its martensitic/austenitic transition temperature, whereby the stiffness of the first flexure member in a straightened configuration is overcome to recover the first actuator member's austenitic shape (e.g., folded). Advantageously, this embodiment of the hinge assembly may be reset a number of times, which is especially useful in ground testing to ensure the device will work as expected on orbit. For purposes of enhancing the stiffness of the hinge assembly to keep the deployed object in a fixed position when deployed, in one embodiment, the first actuator member and the first flexure member may be configured to have an arcuate cross-section. In this regard, the stiffness of the hinge assembly is enhanced when the first flexure member and first actuator member are in a straightened configuration corresponding to the object being deployed. In an alternative embodiment, the means for controlling movement of at least the first flexure member comprises a first actuator member having a shape memory alloy and a means for heating the first actuator member to configure or move the first actuator member from a first, folded configuration corresponding to its martensitic shape, which corresponds to the object in a stowed configuration, to straighter configuration corresponding to its austenitic shape, which corresponds to the object in a deployed position.

In another embodiment, for purposes of minimizing parts and providing a lightweight hinge assembly capable of sequentially deploying the object, the first flexure member having an arcuate cross-sectional configuration comprises a shape memory alloy. As noted hereinabove in relation to other embodiments, the first flexure member in the first configuration (e.g., folded) may spring open toward the second configuration (e.g., straightened) to move the object interconnected thereto from a stowed position to a deployed position, or vice versa. In instances where the first flexure member comprises a shape memory alloy, the means for controlling movement of at least the first flexure member may comprise at least a first means for actuating the first flexure member. In one embodiment, the means for actuating at least the first flexure member comprises at least a first heating means operatively associated with the first flexure member. In this regard, the first flexure member comprising a shape memory alloy may be heated by the first heating means to reconfigure or move the first flexure member from a first (e.g., folded) configuration to a second (e.g., straightened) configuration, or alternatively, vice versa, to deploy the object from a first (e.g., stowed) position to a second (e.g., deployed) position. In this regard, the first flexure member in the folded configuration corresponds to the martensitic state of the shape memory alloy (e.g., twinned martensitic state). As the first flexure member is heated, the first flexure member passes through the transition temperature to an austenitic state to control the straightening of the first flexure member and thus the deployment of the object. Advantageously, once the first flexure member has achieved the straightened configuration corresponding to the deployed position of the object, the heating means may discontinue heating of the first flexure member since the cross-sectional curvature of the first flexure member functions to keep the first flexure member in a straightened configuration. In one embodiment, at least the first heating means is electrically connectable to at least the first flexure member to resistively heat at least the first flexure member, the first flexure member having an austenitic shape corresponding to the object being in a deployed configuration (e.g., straightened). In order to sequentially deploy the object to be deployed to the deployed position or, alternatively, to a selected, intermediate position between the stowed and deployed positions, the heating means may include a means for regulating the amount of heat supplied to the first flexure member. Such means for regulating the amount of heat supplied to at least the first flexure member may also be utilized to vary the rate at which the first flexure member recovers its austenitic, straightened configuration, to thereby vary the deployment rate of the object. In this regard, the means for actuating at least the first flexure member comprising a shape memory alloy may be used to sequentially deploy the object at a plurality of deployment rates, to any of a plurality of positions. Advantageously, this embodiment of the hinge assembly may be reset a number of times, which is especially useful in ground testing to ensure the device will work as expected on orbit, since the first flexure member comprising a shape memory alloy is plastically deformable in its martensitic phase. In this regard, the first flexure member may be bent repeatedly from its straightened configuration (e.g., austenitic shape) to a folded configuration corresponding a stowed position of the object without failure or fracture of the first flexure member. Further, for purposes of enhancing the stiffness of the first flexure member, the first integral heating member may also have an arcuate cross-sectional configuration.

For purposes of achieving repeatability for resetting the hinges of the present invention, the shape memory alloy of the hinges may be conditioned. One process embodiment for conditioning the shape memory alloy includes the selection of a shape memory alloy as may be appropriate for a given application, cold-working such shape memory alloy to a predetermined percentage (e.g., to between about 20% and about 45%), and deforming the cold-worked shape memory alloy to "set" a deformation shape. As will be appreciated, fabrication of the shape memory alloy into a desired configuration (e.g., an actuator mechanism, such as the hinge of the present invention) may be totally or partially completed at this point and/or may be carried out later in the process. The process may further include annealing the cold-worked, deformed shape memory alloy by heating the shape memory alloy to a predetermined annealing temperature (e.g., between about 400° C. and about 500° C., and most preferably about 450° C. for TiNi-containing alloys) for a predetermined period of time to reduce the cold-working to between about 3% and about 8%.

The conditioning process further comprises the conditioning steps of: i) heating the shape memory alloy to a predetermined temperature T that is greater than the finish temperature $A_f$ at which martensitic-austenitic transformation is complete for the selected shape memory alloy yet less than the maximum temperature ($M_d$) at which an austenitic-martensitic phase transformation will be induced by force application/release (e.g., thereby causing the shape memory alloy to revert to its predeformation shape) and ii) applying and releasing a strain and/or stress and/or torsional force to pseudoelastically deflect the shape memory alloy in a manner that minimizes the force application used to initially deform or set the deformation shape, while maintaining the shape memory alloy at the elevated temperature T. Preferably, a substantially constant elevated temperature T (e.g., ±10° C.) should be utilized to provide for isothermal conditioning. The force applied during conditioning should be sufficient to induce an austenitic-martensitic phase transformation. Further, force application/release may be advantageously repeated a predetermined number of cycle times (e.g., preferably at least about 50 cycles, and most preferably about 300 cycles) while maintaining the shape memory alloy at the elevated temperature T. Upon satisfaction of the cyclic criteria for a given shape memory alloy, the conditioned shape memory alloy may then be integrated into the intended application mechanism, and subsequently tested to establish particular performance characteristics. In this regard, the conditioning process of the illustrated embodiment yields a shape memory alloy that is particularly apt for use in high precision actuators, including actuators for use in spacecraft, aircraft and underwater applications where reliable performance is at a premium.

For purposes of at least inhibiting the free play of the object in a deployed position, at least the first flexure member may have an arcuate cross-sectional configuration, which enhances the stiffness of the first flexure member in a straightened configuration. In addition, such arcuate cross-sectional configuration provides a spring or flexural force when the first flexure member is in a folded configuration, which may correspond to the object to be deployed being in a stowed position. In this regard, the first flexure member may be pretensioned in a stowed configuration with a predetermined spring or flexural force, which, when released, is capable of moving the object towards a deployed position. In one embodiment, in order to provide sufficient stiffness to keep the object in a deployed configuration and to inhibit free play of the object in a deployed position while providing sufficient flexure or spring force to deploy an object in at least an extraterrestrial environment in a controllable manner, at least the first flexure member has a radius of curvature of between about 0.25 inch and about 2 inches, and more preferably, between about 0.5 inch and about 1 inch. For purposes of further enhancing at least the stiffness of the hinge in a deployed configuration corresponding to the object being in a deployed position, the means for controlling movement of at least the first flexure member may also have an arcuate cross-sectional configuration. And, in order to provide a degree of redundancy while enhancing the stiffness of the hinge, the hinge may further comprise a second flexure member having an arcuate cross-sectional configuration and comprising a shape memory alloy, whereby the first and second flexure members are electrically connected to first and second heat sources.

DETAILED DESCRIPTION

Figure 1:
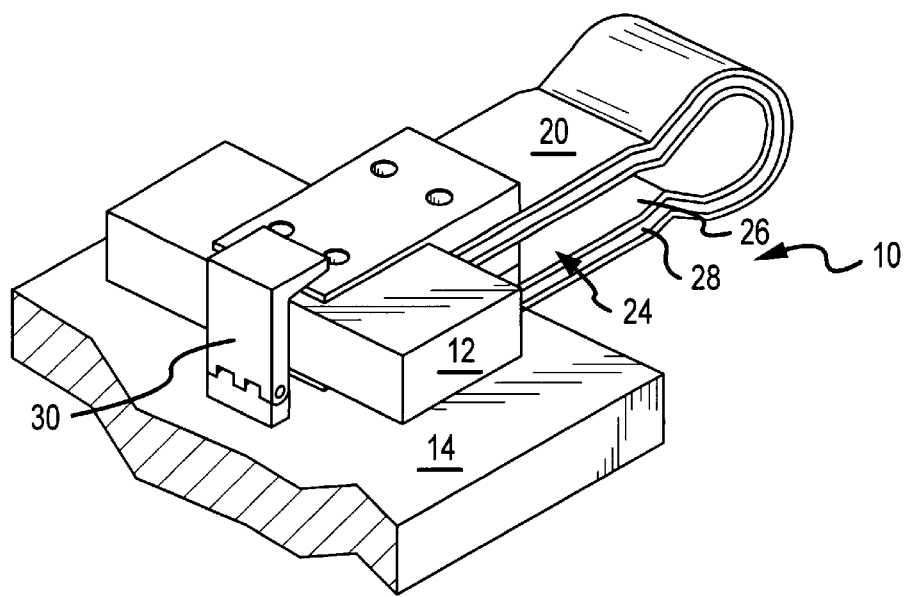
FIG. 1 is a perspective view of one embodiment of the hinge assembly of the present invention in a stowed configuration.

FIGS. 1–19 illustrate the various features of the hinge assembly of the present invention. Generally, the hinge assembly of the present invention includes at least a first flexure member capable of moving from a first configuration (e.g., bent or folded) to a second configuration (e.g., straightened), and a means for controlling the movement or configuration of at least the first flexure member when deploying the object from a first (e.g., stowed) position to a second (e.g., deployed) position. In one embodiment, where the first flexure member is disposed to resiliently flex or spring from the first configuration (e.g., folded) to the second configuration (e.g., straightened), the means for controlling the movement of at least the first flexure member passively controls the resilient flexural movement of at least the first flexure member to provide for a substantially shockless deployment of the object. In another embodiment, the means for controlling the movement of at least the first flexure member initially holds the first flexure member in a folded configuration and then allows the means for controlling to passively control the resilient flexural movement of at least the first flexure member. In yet another embodiment, where the first flexure member itself comprises a shape memory alloy, the means for controlling the movement of at least the first flexure member actively controls the movement of at least the first flexure member by supplying selected amounts of heat to the first flexure member to actuate the first flexure member from its folded shape towards its straightened shape, which also provides for a substantially shockless deployment of the object. Such hinge assemblies may be used to move or otherwise deploy an object in various environments (e.g., underwater, air, space). Since the hinge assembly of the present invention has a minimum number of parts, is lightweight, requires very little to no power to operate, and is resettable, the hinge assembly is especially useful for space applications (e.g., on spacecraft to deploy solar arrays, antennas, or other spacecraft appendages, or, alternatively, on aircraft).

FIGS. 1–10 illustrate various embodiments of the hinge assembly, whereby flexural movement of at least the first flexural member is passively controlled by the means for controlling flexural movement of the first flexural member from a first configuration to a second configuration corresponding to stowed and deployed positions of the object to be deployed, respectively. Referring to FIGS. 1–4, in one embodiment, the hinge assembly 10 for moving an object 12 from a first position (e.g., stowed position) to a second position (e.g., deployed position) includes at least a first flexure member 20 and a means 24 for controlling flexural movement of the first flexural member 20. Specifically, in a first configuration, illustrated in FIG. 1, the first flexure member 20 is flexed or folded, and in a second configuration, illustrated in FIG. 2, the first flexure member 20 is straightened. In this first, folded configuration, the first flexure member 20 has a first stored energy (e.g., pretension) which is greater than a second stored energy of the first flexure member 20 in the second configuration. In this regard, the first flexure member 20 is disposed to flexurally or springingly move the object 12 interconnected thereto from the first position, illustrated in FIG. 1, toward the second position, illustrated in FIG. 2, the first and second positions corresponding to the first and second configurations of the first flexure member 20.

For purposes of enhancing the flexure of the first flexure member 20 to provide an adequate amount of spring force to pivotally move at least the object 12 from its stowed position to its deployed position, and to enhance the stiffness of the first flexure member 20 in the second configuration (e.g., straightened), such that free play or undesirable movements are inhibited when the object 12 is deployed, the first flexure member 20 and/or the means 24 for controlling movement of the first flexure member 20 has an arcuate cross-section, as illustrated in FIGS. 1–4. In a preferred embodiment, illustrated in FIGS. 1–4, both the first flexure member 20 and the means 24 for controlling movement of the first flexure member 20 have similarly oriented arcuate cross-sections to enhance the stiffness of the hinge assembly 10, which is especially useful in maintaining the object 12 in a relatively fixed deployed, cantilevered position (e.g., straightened). In another preferred embodiment, illustrated in FIGS. 5–7, both the first flexure member 120 and the means 124 for controlling movement of the first flexure member 120 have oppositely-oriented arcuate cross-sections to enhance the flexure of the hinge assembly 110 to move the object 112 toward a deployed position, and the stiffness of the hinge assembly 110 when the object 112 is in a deployed, cantilevered position. In still another preferred embodiment, illustrated in FIGS. 8–10, only the first flexure member 220 of the hinge assembly 210 has an arcuate cross-section, while the means 224 for controlling movement of the first flexure member 220 has a substantially linear cross-section.

Referring to FIGS. 1–10, the means 24 for controlling movement of the first flexure member 20 comprises at least a first shape memory alloy flexure member 26 which is interconnectable to the first flexure member 20 via a core member 28. Similarly, the means 124,224 for controlling movement of the first flexure members 120,220, respectively, each comprises first shape memory alloy fixture members 126, 226, respectively, which are interconnectable to the first flexure members 120, 220, respectively, via core members 128, 228 respectively. The first shape memory alloy flexure members 26, 126, 226 may comprise a shape memory alloy, such as nickel-titanium, nickel-titanium-copper, and nickel-titanium-palladium. In this regard, when at least the first flexure members 20, 120, 220 having the first stored energy is released by release mechanisms 30, 130, 230 from a folded configuration corresponding to the objects 12, 112, 212 being in a stowed position, the first shape memory alloy flexure members 26, 126, 226 function as a dashpot that regulates the release of the stored energy of the first flexure members 20, 120, 220. In this regard, passive shockless deployment of the objects 12, 112, 212 is accomplished by the controlled alignment of the martensite structure of the first shape memory alloy flexure member using the stored energy of the first flexure members 20, 120, 220.

Figure 2:
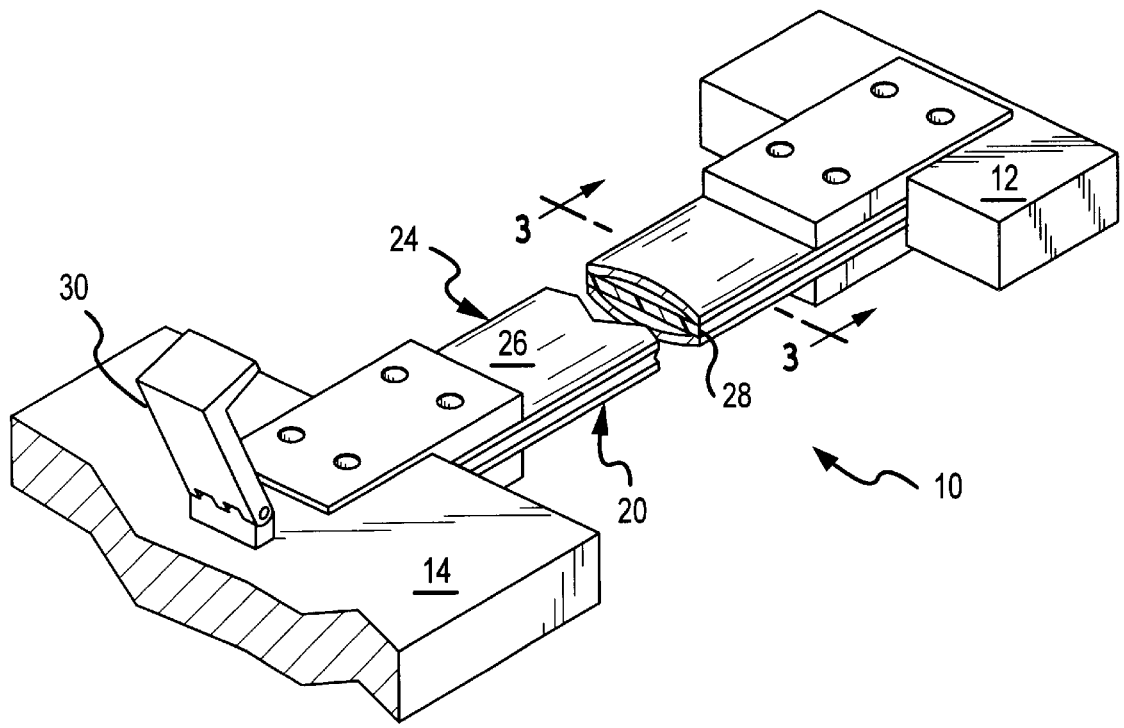
FIG. 2 is a perspective, cut-away view of the hinge illustrated in FIG. 1 in a deployed configuration.
Figure 3:
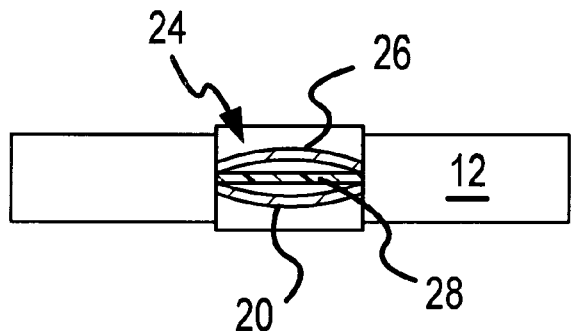
FIG. 3 is a cross sectional view of the hinge assembly of FIG. 2 taken along line 3—3.
Figure 4:
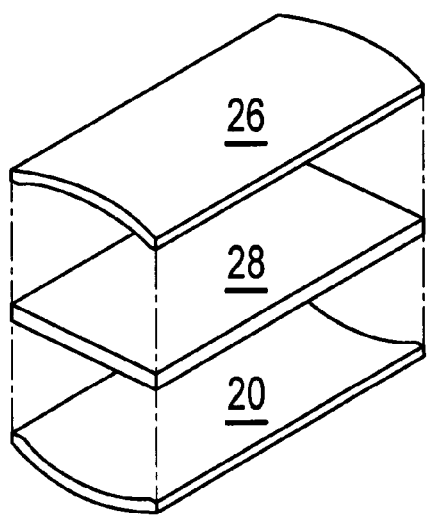
FIG. 4 is an exploded view of the components of the hinge assembly illustrated in FIG. 1.
Figure 5:
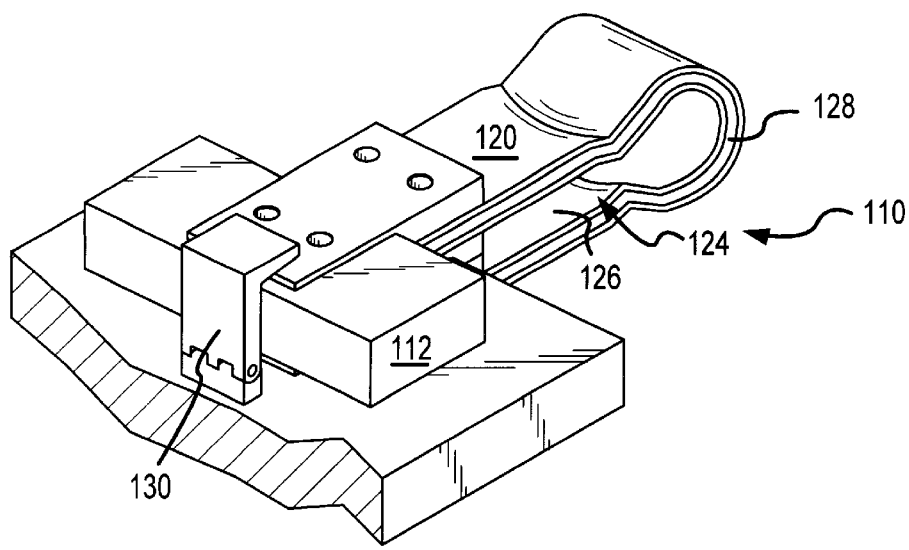
FIG. 5 is a perspective view of another embodiment of the hinge assembly of the present invention in a stowed configuration.
Figure 6:
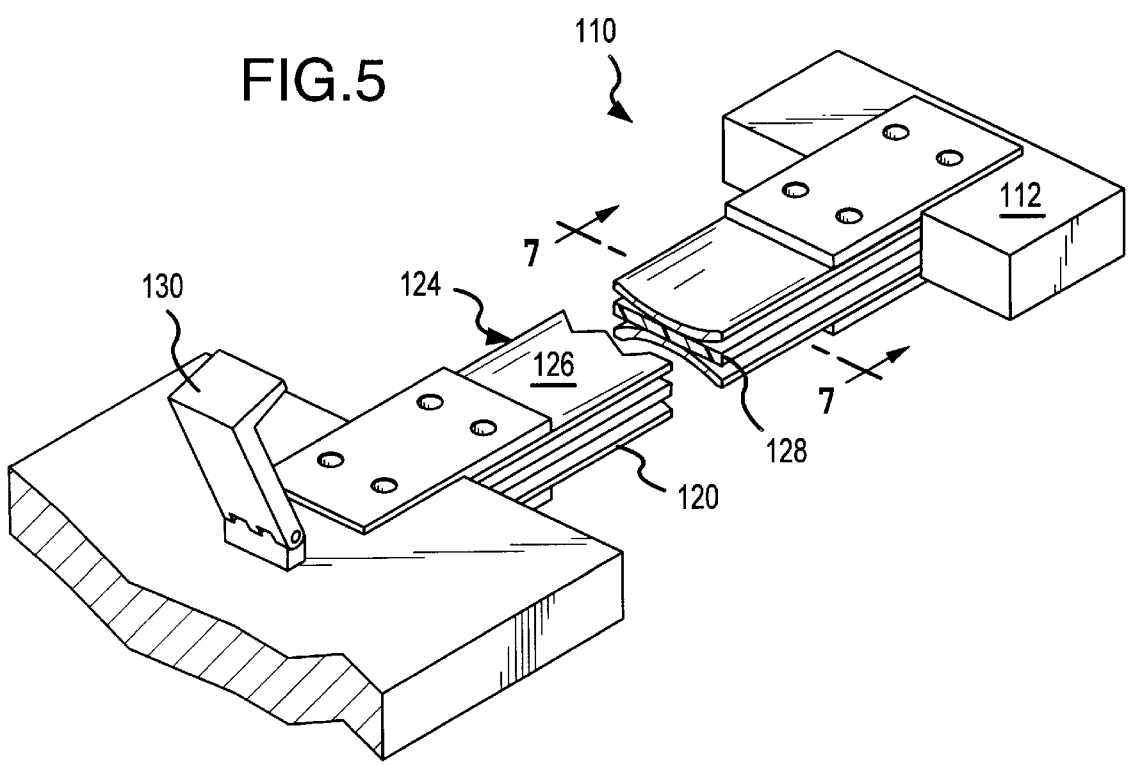
FIG. 6 is a perspective, cut-away view of the hinge assembly illustrated in FIG. 5 in a deployed configuration.
Figure 7:
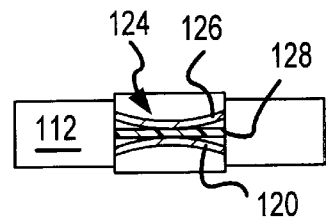
FIG. 7 is a cross sectional view of the hinge assembly illustrated in FIG. 6 taken along line 7—7.
Figure 8:
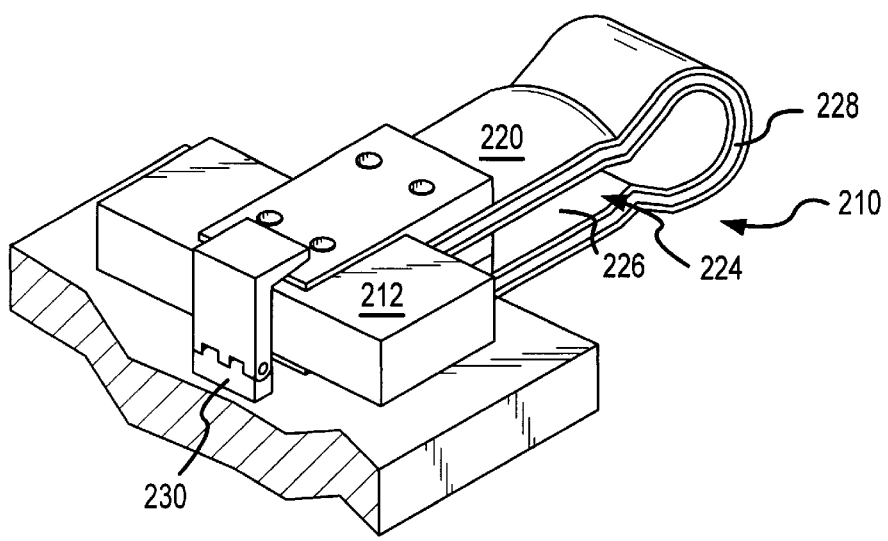
FIG. 8 is a perspective view of another embodiment of the hinge assembly of the present invention in a stowed configuration.
Figure 9:
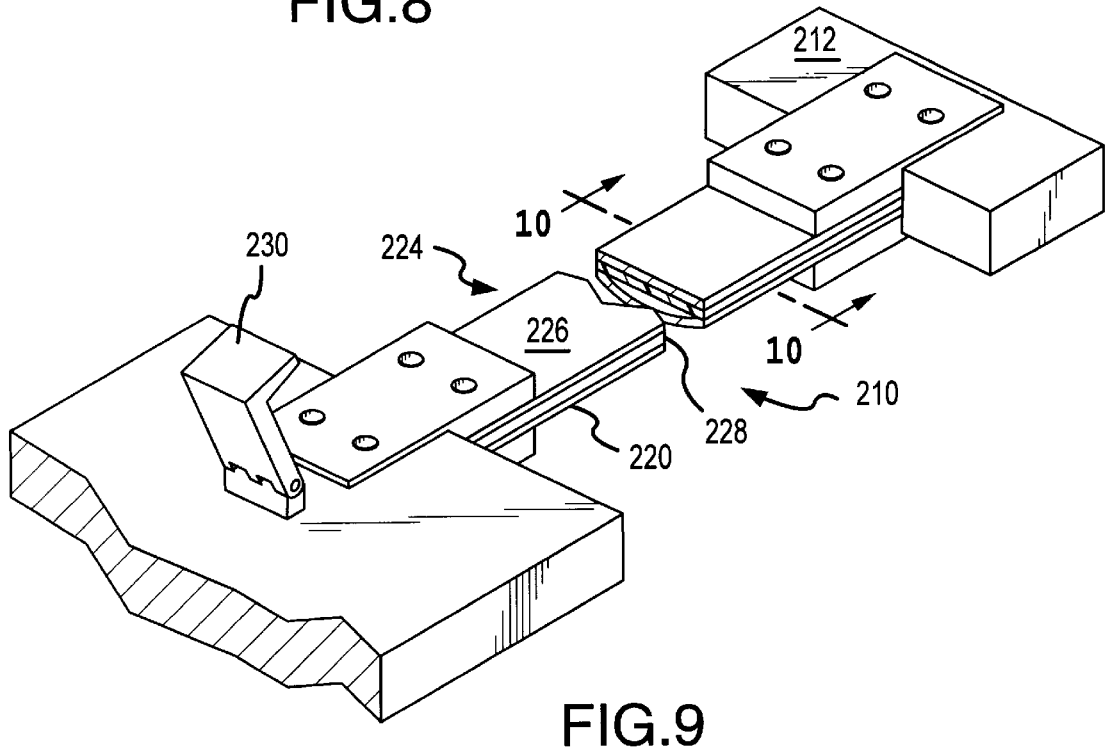
FIG. 9 is a perspective, cut-away view of the hinge assembly illustrated in FIG. 8 in a deployed configuration.
Figure 10:
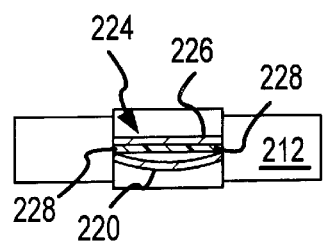
FIG. 10 is a cross-sectional view of the hinge assembly illustrated in FIG. 9 taken along line 10—10.

Such a hinge assembly 10 the present invention may be mounted to a support structure 14, such as a spacecraft, which remains substantially stationary relative to the object 12 to be deployed during movement of the object 12 from a stowed position, illustrated in FIG. 1, to a deployed, cantilevered position, illustrated in FIG. 2. The core member 28 comprises a polymeric core which, in a preferred, embodiment, is bonded to the first flexure member 20 and the first shape memory alloy flexure member 26. Alternatively, the first flexure member 20 may be mechanically fastened to the first shape memory alloy flexure member with the core member 28 interposed there between. Such hinge assemblies 10 are further advantageous for spacecraft applications since the hinge assemblies 10 rely on the controlled release of a small amount of stored energy. For example, the stored energy in a hinge assembly 10 illustrated in FIGS. 1–4, is about 4 inch-pounds, as opposed to stored energy levels of 70 inch-pounds and 90 inch-pounds for conventional torsion spring and carpenter hinge deployment devices, respectively. While the hinge assembly 10 of the present invention requires more time to move the object from the stowed position to the deployed, cantilevered position, illustrated in FIG. 2, such movement is regulated by the first shape memory alloy flexure member 26, which functions as a dashpot by absorbing the stored energy in at least the first flexure member 20 when released from its folded configuration, illustrated in FIG. 2. As such, a substantially shockless deployment is achieved, as opposed to a potentially adverse shock deployment for torsion springs and carpenter hinges, which release stored energy over a relatively short period of time (e.g., one second).

Figure 11:
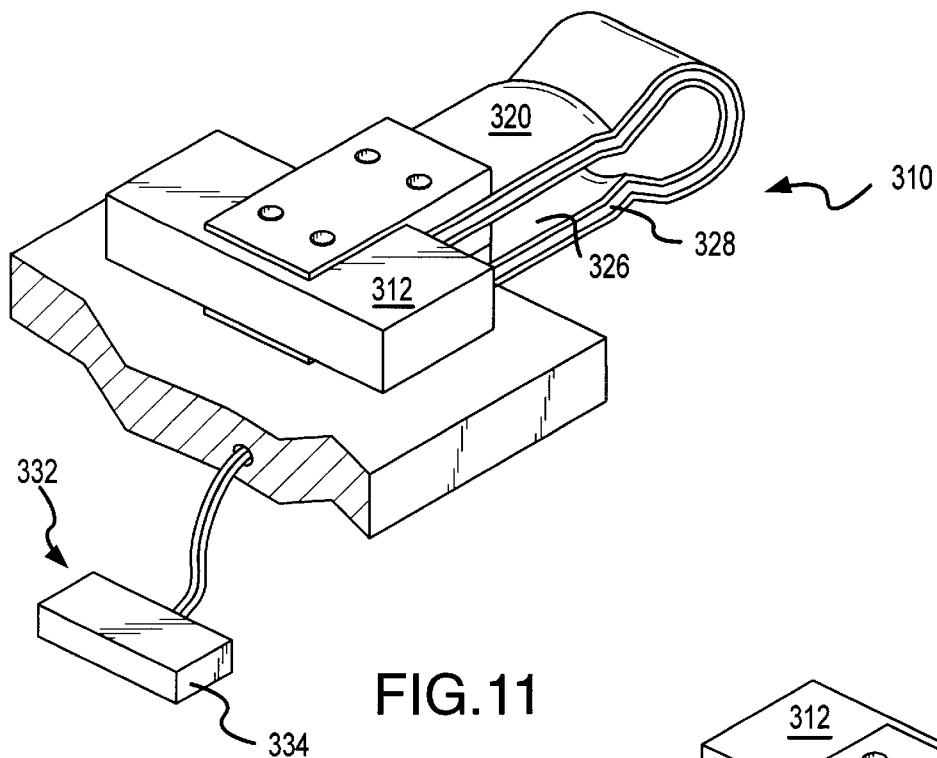
FIG. 11 is a perspective view of another embodiment of the hinge assembly of the present invention in a stowed configuration.
Figure 12:
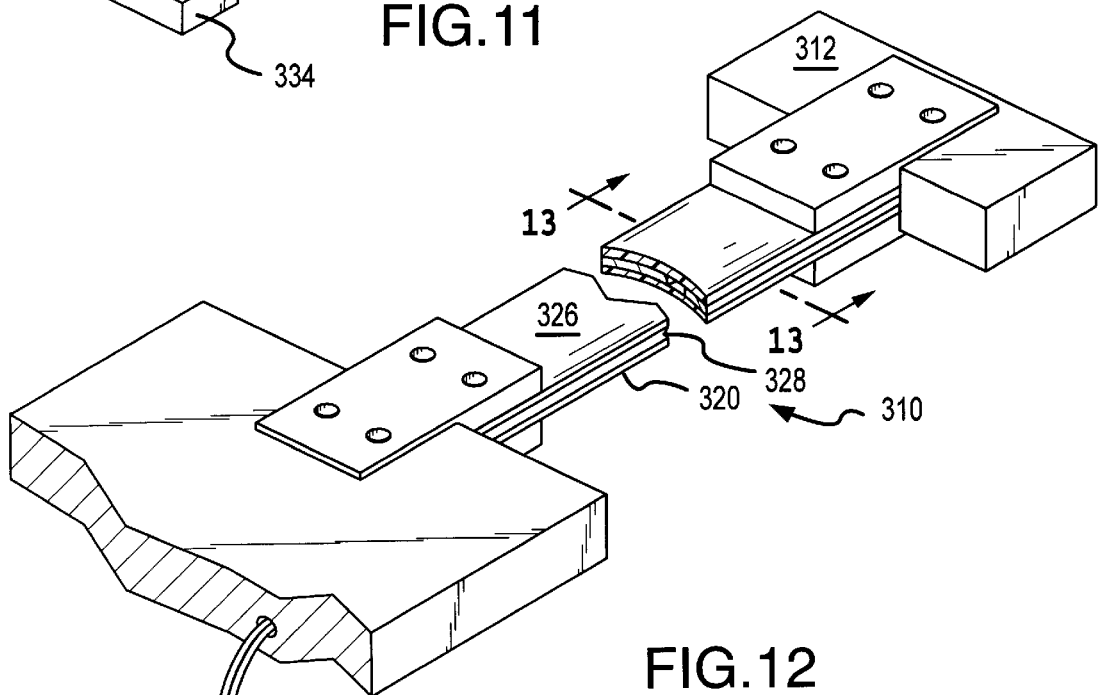
FIG. 12 is a perspective, cut-away view of the hinge assembly illustrated in FIG. 11 in a deployed configuration.
Figure 13:
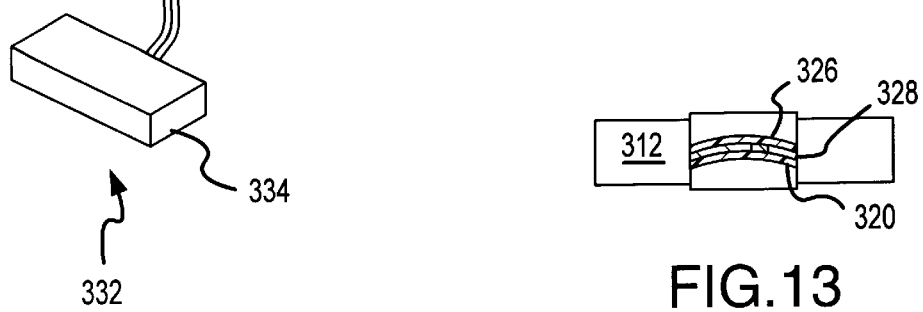
FIG. 13 is a cross-sectional view of the hinge assembly illustrated in FIG. 12 taken along line 13—13.

FIGS. 11–13 illustrate still another embodiment of the hinge assembly of the present invention. Generally, the hinge assembly 310 includes a first flexure member 320 interconnected to at least a first shape memory alloy flexure member 326 via a core member 328. For purposes of moving the object 312 from a stowed configuration, illustrated in FIG. 11, to a deployed, cantilevered position, illustrated in FIG. 12, in a controlled manner, the hinge assembly 310 further includes a means 332 for supplying heat to at least the first shape memory alloy flexure member 326. In one embodiment, the means 332 for supplying heat to the first shape memory alloy flexure member 326 comprises a first electric source 334 which is an electrical connection to the first shape memory alloy flexure member 326 to resistively heat the first shape memory alloy flexure member 326. In this embodiment, the first shape memory alloy flexure member 326 has a twinned martensitic state corresponding to a folded, substantially U-shaped configuration. In this regard, the first electric source 334 is generally used to supply current to at least the first shape memory alloy flexure member 326 to initially heat the first shape memory alloy flexure member 326 to a temperature above the martensitic/austenitic transformation temperature, to an austenitic state, whereby the first shape memory alloy flexure member 326 is capable of at least initially holding the first flexure member 320 in a folded configuration upon release of the object by a release device. Such release devices are commercially available from various sources. Thereafter, heating of the first shape memory alloy flexure member 326 may be discontinued, whereby the first shape memory alloy flexure member 326 cools to its martensitic state and functions as a dashpot by absorbing the release of energy from the first flexure member 320 flexes from the folded configuration, illustrated in FIG. 11, to a straightened configuration, illustrated in FIG. 12. For purposes of maintaining the hinge 310 in a straightened configuration to thereby keep the object in its deployed position, each of the first flexure member 320 and the first shape memory alloy flexure member 326 has an arcuate cross-sectional configuration, as illustrated in FIG. 13.

In yet another embodiment, illustrated in FIGS. 14–18, the hinge assembly 410 comprises first and second shape memory alloy flexure members 426, 427 and first and second heater elements 436, 437 interconnected thereto. For purposes of actively controlling the movement of the object 412 from a stowed position, illustrated in FIG. 15, to a deployed position, illustrated in FIG. 14, the hinge assembly 410 further includes a heat supply means 432 including at least a first electric source 434 for supplying current to the first and second heater elements 436, 437 to resistively heat the first and second shape memory alloy flexure members 426, 427. Heat conductive spacer members 438, 439 comprising, for example, silicon rubber, may be positioned between the first and second shape memory alloy flexure members 426, 427 and the corresponding first and second heater elements 436, 437. Such spacers 438, 439 are generally compliant to bend with the first and second shape memory alloy flexure members 426, 427 and the first and second heater elements 436, 437, and are generally bonded thereto. In one embodiment, the first and second heater elements 436,437 comprise a resistive metal, (e.g., Nichrome, KAPTON®, which is commercially available from DuPont), which is capable of being resistively heated by electric current supplied thereto from a first and/or second electric source 434, 435.

Figure 14:
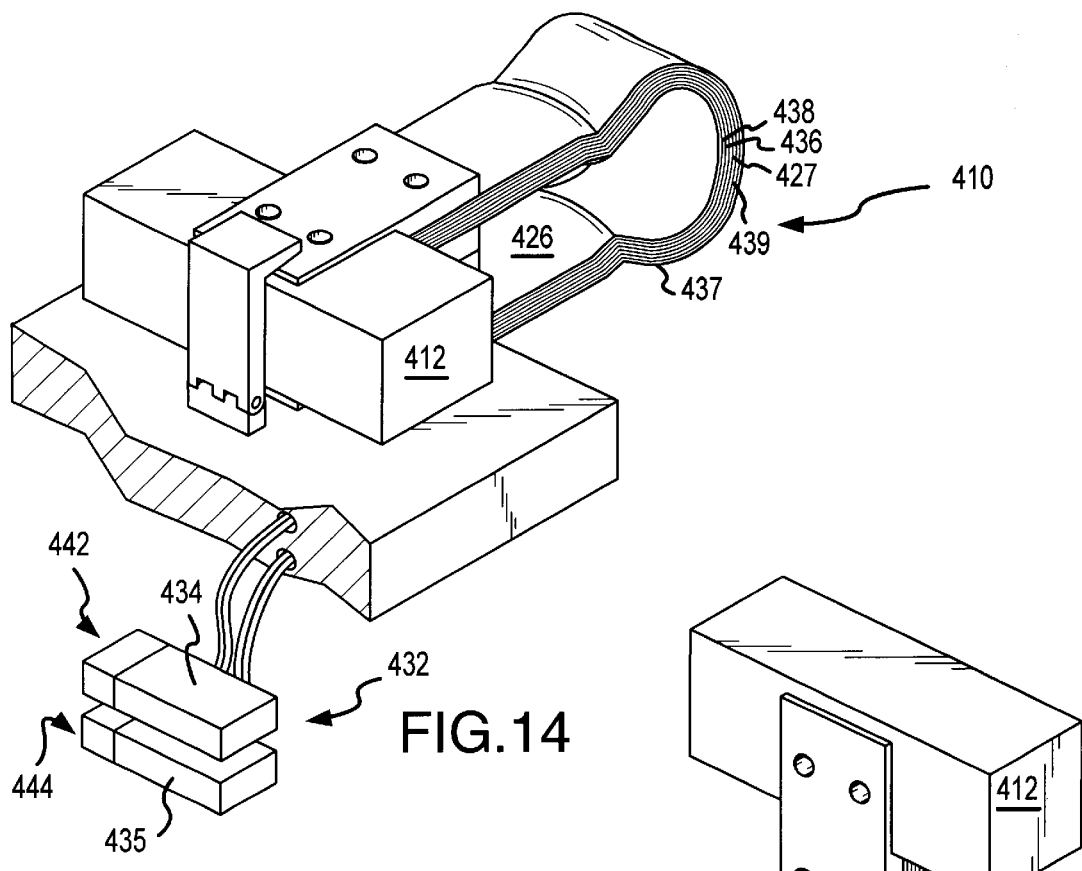
FIG. 14 is a perspective view of another embodiment of the hinge assembly of the present invention in a stowed configuration.
Figure 15:
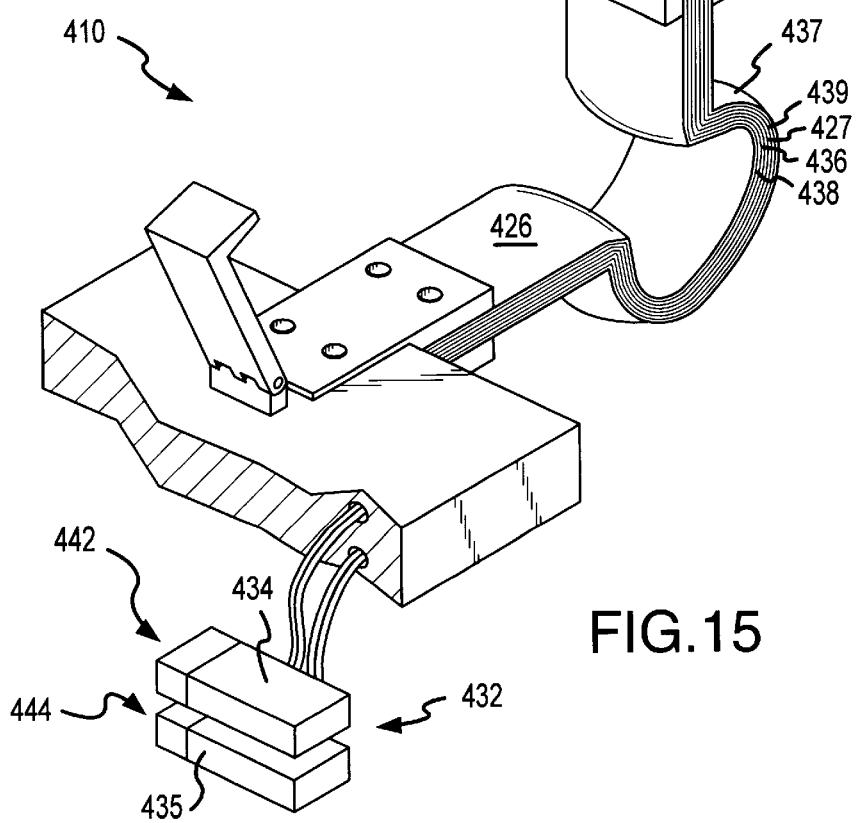
FIG. 15 is a perspective view of the hinge assembly illustrated in FIG. 14 in an intermediate configuration.
Figure 16:
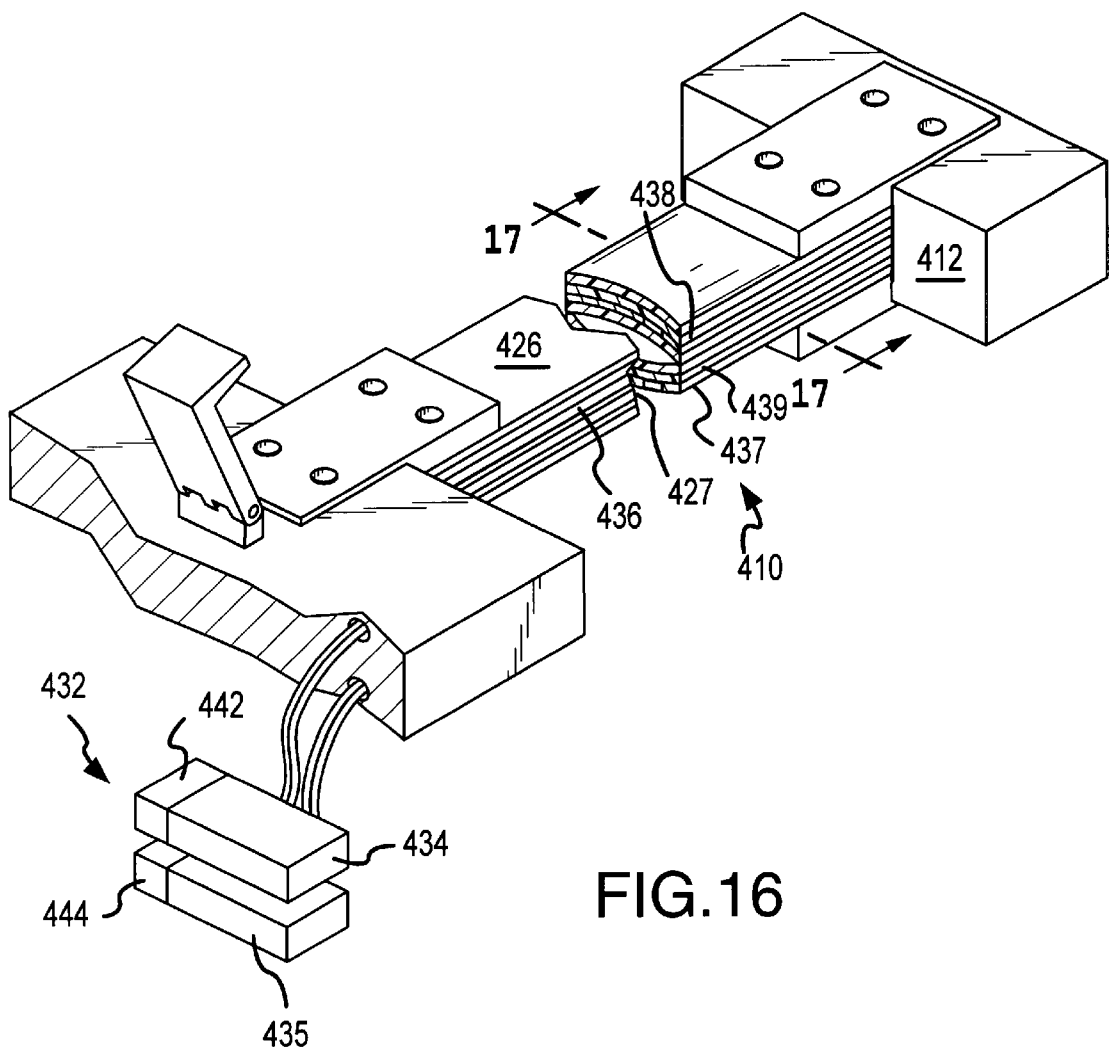
FIG. 16 is a perspective, cut-away view of the hinge assembly illustrated in FIG. 14 in a deployed configuration
Figure 17:
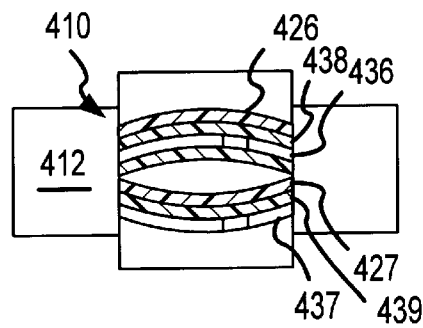
FIG. 17 is a cross-sectional view of the hinge assembly illustrated in FIG. 16 taken along line 17—17.
Figure 18:
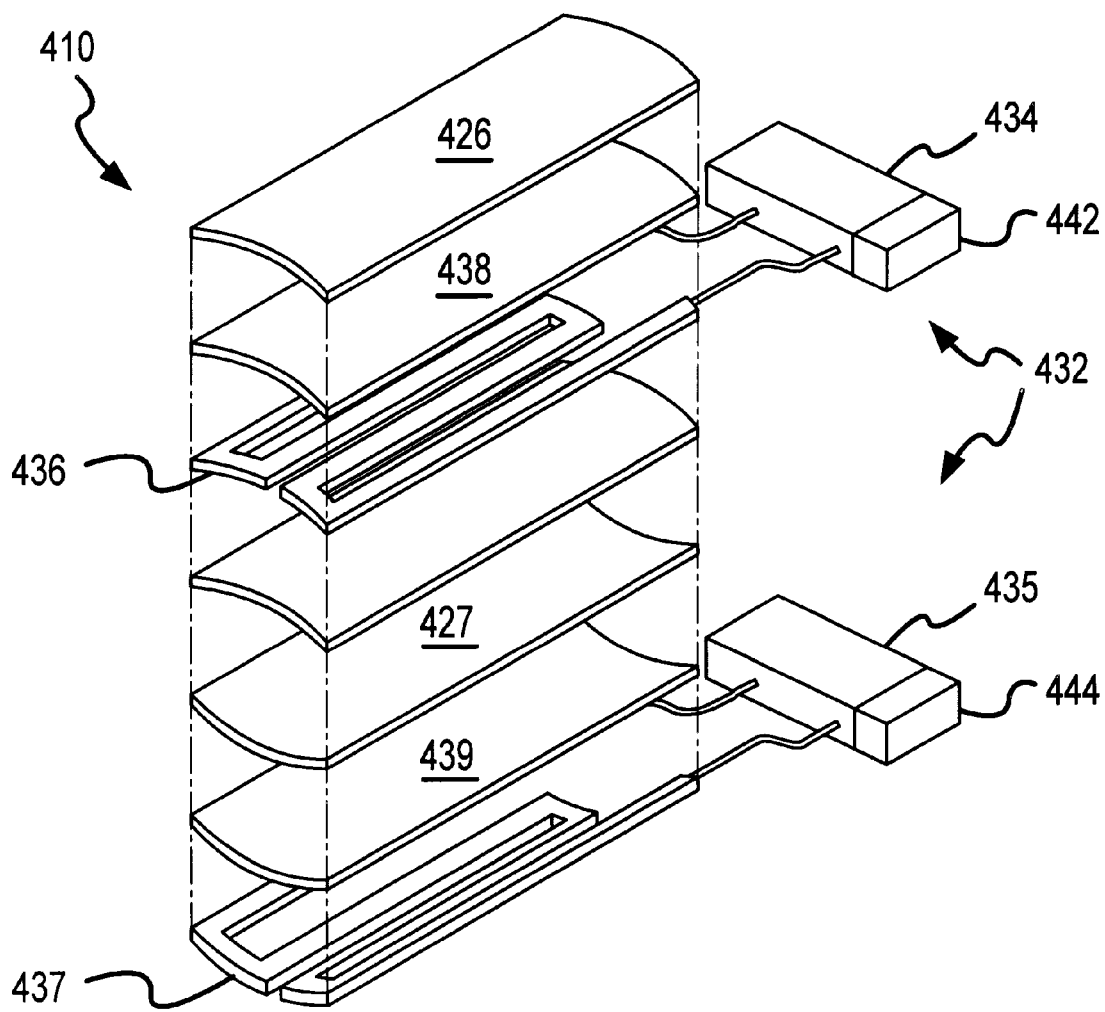
FIG. 18 is an exploded view of the hinge assembly illustrated in FIG. 14.

With regard to the operation of the hinge assembly 410 illustrated in FIGS. 14–18, the object 412 to be deployed from a stowed position, illustrated in FIG. 14, to one of an intermediate position, illustrated in FIG. 15, and a fully deployed position, illustrated in FIG. 16, is moveable from the stowed position as the first and second shape memory alloy flexure members 426,427 are resistively heated by the first and/or second electric sources 434, 435 which supply current to the first and second shape memory alloy flexure members 426, 427. In this regard, the first and second shape memory alloy flexure members 426, 427 have austenitic shapes corresponding to the object 412 being in a deployed position, illustrated in FIG. 16. In order to avoid having to continually heat the first and second shape memory alloy flexure members 426, 427 to maintain their austenitic shape corresponding to the straightened configurations, the first and second shape memory alloy flexure members 426, 427, along with the heater elements 436, 437, have an arcuate cross-section. In this regard, the hinge assembly 410 may remain in a straightened configuration if the first and second shape memory alloy flexure members 426, 427 cool to a temperature below the martensitic/austenitic phase transformation temperature due to the arcuate cross-section of the members.

In order to deploy the object 412 to an intermediate position between the stowed and deployed positions and/or to vary the rate of deployment, the first and second electric sources 434, 435 include current regulators 442, 444, respectively for regulating the amount of current supplied to the first and second shape memory allow flexure members 426, 427, respectively. In this regard, a selected amount of current may be supplied to the first and second shape memory alloy flexure members 426, 427 by the first and second electric sources 434, 435, respectively to heat the first and second shape memory alloy flexure members, via the first and second heater elements 436, 437 interconnecting the flexure members 426, 427 and the electric sources 434, 435 to a temperature corresponding to the temperature required to reconfigure the first and second shape memory allow flexure members 426,427 to a first intermediate position, illustrated in FIG. 15. Such temperatures for such intermediate positioning are predictable in accordance with the fraction of phase transformation associated with a specific change in temperature resulting from the applied/regulated current.

In view of the foregoing, it is evident that the hinge assemblies of the present invention are mechanically simple and offer controlled, shockless deployment of an object. In contrast, other mechanisms (e.g., torsion springs, carpenter hinges, which rely considerably upon stored energy to deploy an object from a stowed position to a deployed position can impart detrimental shock into the objects to be deployed, such as photovoltaic cells, especially since the stored energy in such torsion springs and carpenter hinges are released in a very short period of time. For example, in order to deploy a 750 watt light weight flexible solar array, a torsion spring hinge system having a weight of 0.07 pounds and 10 parts relies on 70-inch pounds of stored energy to deploy the solar array in one second. A carpenter hinge having a weight of 0.02 pounds relies upon a stored energy of about 90-inch pounds to deploy the same solar array in one second. In contrast, one embodiment of the hinge assembly of the present invention has a weight of about 0.02 pounds and relies only upon 4-inch pounds of stored energy to deploy an equivalent solar array in about 30 seconds. In this regard, the hinge assembly of the present invention provides a light weight hinge which deploys objects in a controlled, shockless manner, which is particularly useful for sensitive systems and components thereof, including solar array panels and photovoltaic cells thereof, antennas, etc.

Figure 19:
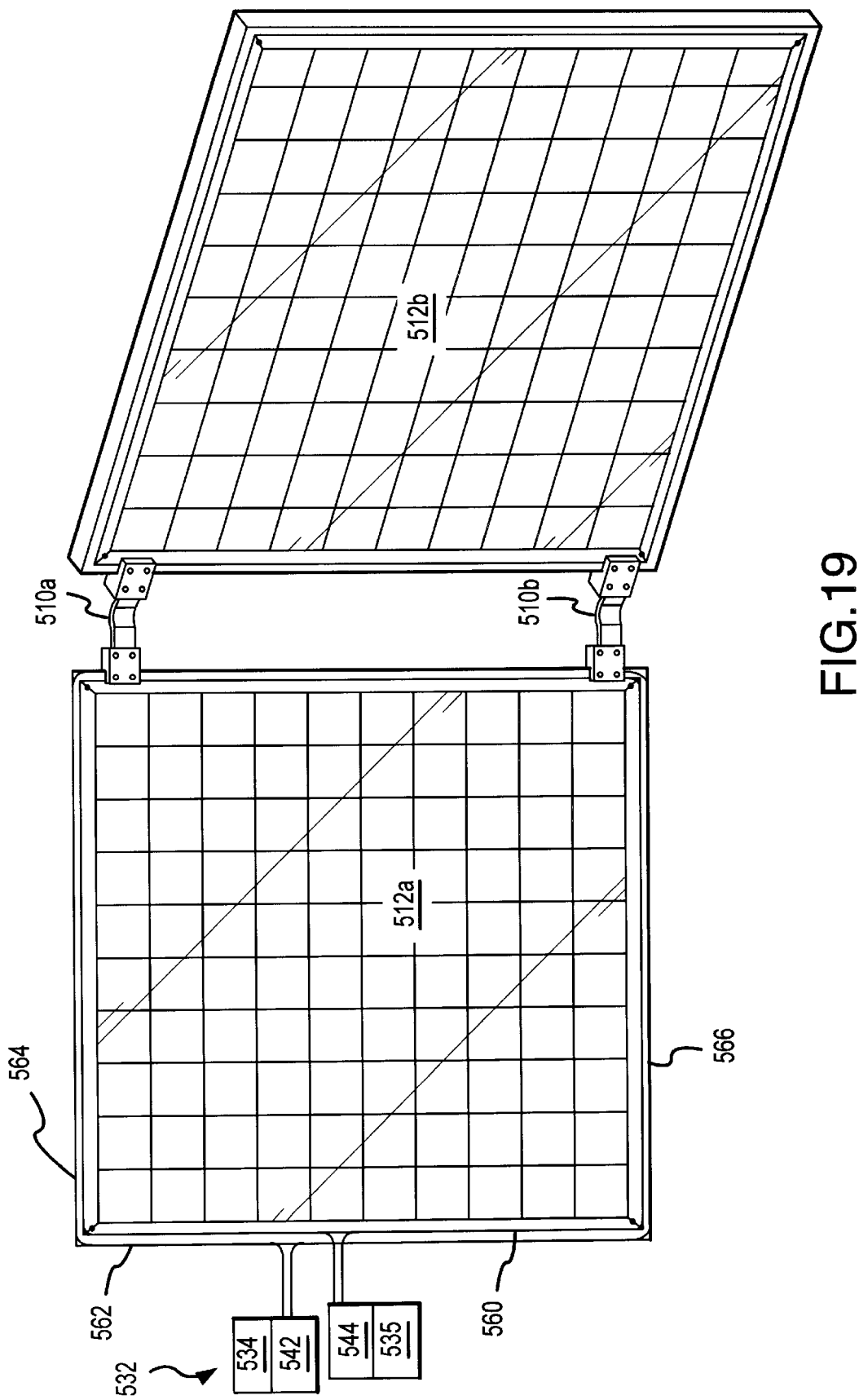
FIG. 19 is a perspective view of the hinges of the present invention interconnected to two solar array panels.

For example, and referring to FIG. 19, first and second hinges 510a, 510b are interconnectable to the first and second solar array panels 512a, 512b to deploy and/or stow the panels. The first and second hinges 510a, 510b each include first and second shape memory alloy flexure members and first and second heater elements for deploying the solar arrays 512a, 512b in a controlled, substantially shockless manner. In this regard, the first and second shape memory alloy flexure members are moveable from the stowed position as the first and second shape memory alloy flexure members are resistively heated by the first and/or second electric sources 534, 535 including current regulators 542, 544, which supply current to the first and second hinges 510a, 510b. In this regard, the first and second shape memory alloy flexure members of the hinges 510a, 510b have austenitic shapes corresponding to the objects 512a, 512b being in a deployed position.

In order to provide a degree of redundancy, the first and second hinges 510a, 510b are electrically connected to both the first and second electric sources 534, 535. Specifically, the first electric source 534 is electrically connectable via the wires 560, 562 to one of the shape memory alloy flexure members of the first and second hinges 510a, 510b, and the second electric source 535 is electrically connectable via wires 564, 566 to the other of the shape memory alloy flexure members of the first and second hinges 510a, 510b. In this regard, in the event one of the electric sources 534, 535 fails, the other of the electric sources 542, 544 may be utilized to supply electric current to both of the hinges 510a, 510b to drive the deployment of the solar array panels 512a, 512b.

The foregoing description of the present invention has been presented for purposes of illustration and description. Furthermore, the description is not intended to limit the invention to the form disclosed herein. Consequently, variations and modifications commensurate with the above teachings and with the skill or knowledge of the relevant art are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A hinge apparatus for moving an object interconnected thereto to at least one of first and second positions, comprising:

at least a first flexure member having first and second end portions and an intermediate portion therebetween, for moving the object interconnected thereto from at least the first position at least towards the second position as said first flexure member moves from a first configuration towards a second configuration, said first flexure member being interconnectable to the object, wherein said first flexure member has an arcuate cross-sectional configuration and is resiliently flexurable about said intermediate portion to flexurally move from said first configuration corresponding to the object in the first position to said second configuration corresponding to the object in the second position, said first flexure member being foldable to a substantially U-shape in said first configuration, wherein said first flexure member in said first configuration has a first stored energy greater than a second stored energy of said first flexure member in said second configuration; and a means, interconnectable to at least said first flexure member, for controlling movement of at least said first flexure member from said first configuration to said second configuration, wherein said means for controlling movement comprises a means for absorbing said first stored energy of at least said first flexure member as said first flexure member flexurally moves from said first configuration to said second configuration, said first flexure member being substantially straighter in said second configuration than in said first configuration, wherein said means for absorbing comprises a first plastically deformable damping member, said first plastically deformable damping member comprising a shape memory alloy having at least a martensite phase.

2. A hinge apparatus, as claimed in claim 1, wherein said arcuate cross-sectional configuration of said first flexure member has radius of curvature of at least 0.25 inch.

3. A hinge apparatus, as claimed in claim 1, wherein said first plastically deformable damping member has an austenitic shape corresponding to the first flexure member in said first configuration, wherein said means for controlling movement further comprises a means for heating said first plastically deformable damping member to move said first flexure member from said second configuration at least toward said first configuration by recovering said austenitic shape of said first plastically deformable damping member.

4. A hinge apparatus, as claimed in claim 1, wherein said means for controlling movement comprises a means for releasably locking said first flexure member in at least said first configuration.

5. A hinge assembly for moving an object interconnected thereto to at least one of first and second positions, comprising:
   at least a first flexure member, having first and second end portions and an intermediate portion therebetween, for moving the object interconnected to one of said first and second end portions from the first position to the second position corresponding to first and second configurations of said first flexure member, respectively, wherein said first flexure member comprises a first shape memory alloy; and
   a means, interconnectable to said first flexure member, for actively controlling movement of at least said first flexure member between said first and second configurations, wherein said means for actively controlling comprises a first heating means, electrically connected to said first flexure member, for resistively heating said first flexure member to actuate said first flexure member from said first configuration to at least one of said second configuration and a third configuration therebetween to move the object from the first position to at least one of the second position and a third position therebetween.

6. A hinge assembly, as claimed in claim 5, wherein at least first and second end portions of said first flexure member are interconnectable to said means for controlling via at least one of an adhesive and a fastener.

7. A hinge apparatus, as claimed in claim 5, wherein said first flexure member has an arcuate cross-sectional configuration, wherein said first flexure member in said first configuration has a first stored energy greater than a second stored energy of said first flexure member in said second configuration.

8. A hinge assembly, as claimed in claim 5, wherein said first heating means comprises a means for regulating the amount of current supplied to said first flexure member to selectively actuate said first flexure member from said first configuration to said third configuration.

9. A hinge assembly, as claimed in claim 5, wherein said first and second configurations correspond to folded and straightened configurations of said first flexure members.

10. A hinge assembly, as claimed in claim 5, wherein said first heating means comprises a first integral heater interconnected to at least said first flexure member and an electric source.

11. A hinge assembly, as claimed in claim 10, wherein said first integral heater has an arcuate cross-section.

12. A hinge assembly, as claimed in claim 5, wherein said first heating means comprises a first heating member electrically connectable to an electric source, said hinge assembly further comprising:
   a first elastomeric member interposed between said first flexure member and said first heating member, wherein said first elastomeric member is heat conductive to transfer heat from said first heating member to said first flexure member.

13. A hinge assembly, as claimed in claim 5, further comprising:
   a second flexure member interconnectable to said first flexure member, said second flexure member comprising a second shape memory alloy and having austenitic and martensitic shapes corresponding to said second and first configurations of said first flexure member, respectively, wherein said second flexure member is interconnectable to one of said first heating means and a second heating means for heating said second flexure member to actuate said second flexure member at least from said first configuration to said second configuration, with said first flexure member, to move the object from the first position to the second position.

14. A hinge assembly, as claimed in claim 13, wherein said second flexure member has an arcuate cross-sectional configuration.

15. A hinge apparatus for moving an object interconnected thereto to at least one of first and second positions, comprising:
   at least a first flexure member having first and second end portions and an intermediate portion therebetween, for moving the object interconnected thereto from at least the first position at least towards the second position as said first flexure member moves from a first configuration toward a second configuration, said first flexure member being interconnectable to the object, wherein said first flexure member comprises a shape memory alloy, said first flexure member having an austenitic shape corresponding to said second configuration; and
   a means, interconnectable to at least said first flexure member, for controlling movement of at least said first flexure member from said first configuration to said second configuration, wherein said means for controlling movement comprises a means for actuating at least said first flexure member between said first configuration corresponding to the object in the first position and said second configuration corresponding to the object in the second position, wherein said means for actuating comprises at least a first heating means electrically connected to said first flexure member for resistively heating said first flexure member to move said first flexure member at least toward said second configuration.

16. A hinge apparatus as claimed in claim 15, wherein said means for actuating further comprises a means for regulating the amount of current supplied to said first flexure member to selectively actuate said first flexure member from said first configuration to at least a third configuration between said first and second configurations to selectively position the object to a third position between the first and second positions.

17. A hinge assembly for moving an object interconnected thereto to at least one of first and second positions, comprising:
   at least a first flexure member, having first and second end portions and an intermediate portion therebetween, for moving the object interconnected to one of said first and second end portions from the first position to the second position corresponding to first and second configurations of said flexure member, respectively; and
   a means, interconnectable to said first flexure member, for passively controlling movement of at least said first flexure member between said first and second configurations, wherein said means for passively controlling comprises a plastically deformable member comprising a shape memory alloy having at least a martensitic shape corresponding to said first flexure member being in said first configuration and an austenitic shape corresponding to said first flexure member being in said second configuration, said plastically deformable member being bendable at least in said martensitic shape to absorb stored energy of said first flexure member as said first flexure member flexes from said first configuration to said second configuration.

18. A hinge assembly, as claimed in claim 17, wherein said plastically deformable member has an arcuate cross-section.

19. A hinge assembly for moving an object interconnected thereto to at least one of first and second positions, comprising:

at least a first flexure member, having first and second end portions and an intermediate portion therebetween, for moving the object interconnected to one of said first and second end portions from the first position to the second position corresponding to first and second configurations of said first flexure member, respectively; and a means, interconnectable to said first flexure member, for actively controlling movement of at least said first flexure member between said first and second configurations, wherein said means for actively controlling comprises a plastically deformable member comprising a shape memory alloy having an austenitic shape corresponding to said first flexure member in said first configuration and a martensitic shape corresponding said first flexure member in said second configuration, wherein said means for actively controlling further comprises a means for selectively heating said plastically deformable member to recover said austenitic shape of said plastically deformable member to configure said first flexure member in said first configuration.

20. A hinge assembly for moving an object interconnected thereto to at least one of first and second positions, comprising:

at least a first flexure member, having first and second end portions and an intermediate portion therebetween, for moving the object interconnected to one of said first and second end portions from the first position to the second position corresponding to first and second configurations of said first flexure member, respectively, wherein said first flexure member comprises a shape memory alloy, said first flexure member having a martensitic shape and an austenitic shape corresponding to said first and second configurations of said first flexure member, respectively, wherein said first flexure member has an arcuate cross-sectional configuration and is folded in said first configuration and straightened in said second configuration; and a means, interconnectable to said first flexure member, for one of passively and actively controlling movement of at least said first flexure member between said first and second configurations.

21. A hinge assembly for moving an object interconnected thereto to at least one of first and second positions, comprising:

at least a first flexure member, having first and second end portions and an intermediate portion therebetween, for moving the object interconnected to one of said first and second end portions from the first position to the second position corresponding to first and second configurations of said first flexure member, respectively, wherein said first flexure member comprises a first shape memory alloy, said first flexure member having a first austenitic shape and a first martensitic shape corresponding to said first and second configurations of said first flexure member; and a means, interconnectable to said first flexure member, for actively controlling movement of at least said first flexure member between said first and second configurations, wherein said means for actively controlling movement comprises first heating means, operatively associated with said first flexure member, for heating said first flexure member to actuate said first flexure member from at least said second configuration to said first configuration.

22. A hinge assembly, as claimed in claim 21, wherein said first austenitic shape of said first flexure member is substantially U-shaped and said martensitic shape of said first flexure member is a substantially straight configuration.

* * * * *

UNITED STATES PATENT AND TRADEMARK OFFICE
CERTIFICATE OF CORRECTION

PATENT NO. : 6,175,989 B1
DATED : January 23, 2001
INVENTOR(S) : Carpenter et al.

It is certified that error appears in the above-identified patent and that said Letters Patent is hereby corrected as shown below:

<u>Title page,</u>
Insert:
-- [73] Assignee: Lockheed Martin Corporation, Bethesda, MD (US) --.

Signed and Sealed this

Fifteenth Day of April, 2003

JAMES E. ROGAN
*Director of the United States Patent and Trademark Office*